(12) United States Patent
Ferris et al.

(10) Patent No.: US 10,021,037 B2
(45) Date of Patent: *Jul. 10, 2018

(54) PROVISIONING CLOUD RESOURCES

(71) Applicant: Red Hat, Inc., Raleigh, NC (US)

(72) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,689

(22) Filed: Aug. 15, 2016

(65) Prior Publication Data

US 2016/0352646 A1 Dec. 1, 2016

Related U.S. Application Data

(60) Continuation of application No. 13/942,268, filed on Jul. 15, 2013, now Pat. No. 9,419,913, which is a
(Continued)

(51) Int. Cl.
*G06F 15/16* (2006.01)
*H04L 12/911* (2013.01)
(Continued)

(52) U.S. Cl.
CPC ............ *H04L 47/70* (2013.01); *G06F 9/5072* (2013.01); *G06F 11/3006* (2013.01);
(Continued)

(58) Field of Classification Search
CPC ............ G06F 11/3006; G06F 11/3051; G06F 11/3442; G06F 11/3495; G06F 2201/815;
(Continued)

(56) References Cited

U.S. PATENT DOCUMENTS 6,463,457 B1 10/2002 Armentrout et al.
7,313,796 B2 12/2007 Hamilton et al.
(Continued)

OTHER PUBLICATIONS

USPTO, Notice of Allowance for U.S. Appl. No. 12/790,366, dated Apr. 1, 2013.
(Continued)

*Primary Examiner* — Zarni Maung
(74) *Attorney, Agent, or Firm* — Lowenstein Sandler LLP

(57) ABSTRACT

Cloud resource provisioning is described. A cloud resource provisioning method may include receiving, by a processor, a cloud resource usage data identifying a first cloud resource consumed, a first usage level associated with the first cloud resource, a second cloud resource consumed, and a second usage level associated with the second cloud resource, wherein the first and second cloud resources are in respective first and second clouds. The method may further include assigning a first importance indicator to the first cloud resource. The method may further include assigning a second importance indicator to the second cloud resource. The method may further include analyzing the first and second importance indicators to identify a preference for the first cloud resource over the second cloud resource. The method may further include causing, in view of the analyzing, the first cloud resource to be provisioned at least at the first usage level and the second cloud resource to be provisioned at a reduced usage level below the second usage level.

20 Claims, 9 Drawing Sheets

Related U.S. Application Data division of application No. 12/790,366, filed on May 28, 2010, now Pat. No. 8,504,689.

(51) Int. Cl.
  *H04L 29/08* (2006.01)
  *G06F 9/50* (2006.01)
  *G06F 11/30* (2006.01)
  *G06F 11/34* (2006.01)
  *G06F 12/00* (2006.01)

(52) U.S. Cl.
  CPC ...... *G06F 11/3051* (2013.01); *G06F 11/3442* (2013.01); *G06F 11/3495* (2013.01); *H04L 29/08072* (2013.01); *H04L 29/08144* (2013.01); *G06F 2201/815* (2013.01); *G06F 2201/875* (2013.01)

(58) Field of Classification Search
  CPC ............. G06F 2201/875; G06F 9/5072; H04L 29/08144; H04L 47/70
  See application file for complete search history.

(56) References Cited

U.S. PATENT DOCUMENTS

| | | | |
|---|---|---|---|
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 8,255,529 | B2 | 8/2012 | Ferris |
| 8,271,653 | B2 | 9/2012 | DeHaan |
| 8,316,125 | B2 | 11/2012 | DeHaan |
| 8,364,819 | B2 | 1/2013 | Ferris |
| 8,375,223 | B2 | 2/2013 | DeHaan |
| 8,402,139 | B2 | 3/2013 | Ferris |
| 8,504,443 | B2 | 8/2013 | Ferris |
| 8,504,689 | B2 | 8/2013 | Ferris |
| 8,606,667 | B2 | 12/2013 | Ferris |
| 8,606,897 | B2 | 12/2013 | Ferris et al. |
| 8,612,577 | B2 | 12/2013 | Ferris |
| 8,612,615 | B2 | 12/2013 | Ferris |
| 8,631,099 | B2 | 1/2014 | Morgan |
| 8,713,147 | B2 | 4/2014 | Ferris |
| 8,769,083 | B2 | 7/2014 | Ferris |
| 8,782,192 | B2 | 7/2014 | Morgan |
| 8,825,791 | B2 | 9/2014 | Morgan |
| 8,832,219 | B2 | 9/2014 | Morgan |
| 8,832,459 | B2 | 9/2014 | Morgan |
| 8,862,720 | B2 | 10/2014 | DeHaan |
| 8,880,700 | B2 | 11/2014 | Ferris et al. |
| 8,904,005 | B2 | 12/2014 | Ferris |
| 8,909,783 | B2 | 12/2014 | Ferris et al. |
| 8,909,784 | B2 | 12/2014 | Ferris |
| 8,924,539 | B2 | 12/2014 | Ferris |
| 8,949,426 | B2 | 2/2015 | Morgan |
| 8,954,564 | B2 | 2/2015 | Ferris |
| 8,959,221 | B2 | 2/2015 | Morgan |
| 8,977,750 | B2 | 3/2015 | Ferris |
| 8,984,104 | B2 | 3/2015 | Morgan |
| 9,037,723 | B2 | 5/2015 | Morgan |
| 9,053,472 | B2 | 6/2015 | Ferris et al. |
| 9,104,407 | B2 | 8/2015 | DeHaan |
| 9,201,485 | B2 | 12/2015 | DeHaan |
| 9,202,225 | B2 | 12/2015 | Ferris |
| 9,311,162 | B2 | 4/2016 | DeHaan |
| 9,354,939 | B2 | 5/2016 | Ferris et al. |
| 9,389,980 | B2 | 7/2016 | Ferris |
| 9,419,913 | B2 * | 8/2016 | Ferris ................. G06F 9/5072 |
| 2001/0039497 | A1 | 11/2001 | Hubbard |
| 2002/0069276 | A1 | 6/2002 | Hino et al. |
| 2002/0165819 | A1 | 11/2002 | McKnight et al. |
| 2003/0037258 | A1 | 2/2003 | Koren |
| 2003/0101124 | A1 | 5/2003 | Semret |
| 2003/0105810 | A1 | 6/2003 | McCrory |
| 2003/0110252 | A1 | 6/2003 | Yang-Huffman |
| 2003/0135609 | A1 | 7/2003 | Carlson et al. |
| 2003/0177176 | A1 | 9/2003 | Hirschfeld et al. |
| 2004/0010592 | A1 | 1/2004 | Carver |
| 2004/0162902 | A1 | 8/2004 | Davis |
| 2004/0210591 | A1 | 10/2004 | Hirschfeld et al. |
| 2004/0210627 | A1 | 10/2004 | Kroening |
| 2004/0268347 | A1 | 12/2004 | Knauerhase et al. |
| 2005/0131898 | A1 | 6/2005 | Fatula |
| 2005/0144060 | A1 | 6/2005 | Chen et al. |
| 2005/0182727 | A1 | 8/2005 | Robert et al. |
| 2005/0289540 | A1 | 12/2005 | Nguyen et al. |
| 2006/0075042 | A1 | 4/2006 | Wang et al. |
| 2006/0085530 | A1 | 4/2006 | Garrett |
| 2006/0085824 | A1 | 4/2006 | Bruck et al. |
| 2006/0130144 | A1 | 6/2006 | Wernicke |
| 2006/0177058 | A1 | 8/2006 | Sarwono et al. |
| 2006/0224436 | A1 | 10/2006 | Matsumoto et al. |
| 2007/0011052 | A1 | 1/2007 | Liu et al. |
| 2007/0011291 | A1 | 1/2007 | Mi et al. |
| 2007/0028001 | A1 | 2/2007 | Phillips et al. |
| 2007/0226715 | A1 | 9/2007 | Kimura et al. |
| 2007/0283282 | A1 | 12/2007 | Bonfiglio et al. |
| 2007/0294676 | A1 | 12/2007 | Mellor et al. |
| 2008/0080396 | A1 | 4/2008 | Meijer et al. |
| 2008/0080552 | A1 | 4/2008 | Gates |
| 2008/0080718 | A1 | 4/2008 | Meijer et al. |
| 2008/0082538 | A1 | 4/2008 | Meijer et al. |
| 2008/0082601 | A1 | 4/2008 | Meijer et al. |
| 2008/0083025 | A1 | 4/2008 | Meijer et al. |
| 2008/0083040 | A1 | 4/2008 | Dani et al. |
| 2008/0086727 | A1 | 4/2008 | Lam et al. |
| 2008/0091613 | A1 | 4/2008 | Gates et al. |
| 2008/0104608 | A1 | 5/2008 | Hyser et al. |
| 2008/0201253 | A1 | 8/2008 | Gray et al. |
| 2008/0201459 | A1 | 8/2008 | Vul et al. |
| 2008/0215796 | A1 | 9/2008 | Lam et al. |
| 2008/0240150 | A1 | 10/2008 | Dias et al. |
| 2008/0313642 | A1 | 12/2008 | Karaoguz et al. |
| 2009/0012885 | A1 | 1/2009 | Cahn |
| 2009/0025006 | A1 | 1/2009 | Waldspurger |
| 2009/0037496 | A1 | 2/2009 | Chong et al. |
| 2009/0089078 | A1 | 4/2009 | Bursey |
| 2009/0099940 | A1 | 4/2009 | Frederick et al. |
| 2009/0119673 | A1 | 5/2009 | Bubba |
| 2009/0132695 | A1 | 5/2009 | Surtani et al. |
| 2009/0177514 | A1 | 7/2009 | Hudis et al. |
| 2009/0210527 | A1 | 8/2009 | Kawato |
| 2009/0210875 | A1 | 8/2009 | Bolles et al. |
| 2009/0217267 | A1 | 8/2009 | Gebhart et al. |
| 2009/0222805 | A1 | 9/2009 | Faus et al. |
| 2009/0228950 | A1 | 9/2009 | Reed et al. |
| 2009/0248693 | A1 | 10/2009 | Sagar et al. |
| 2009/0249287 | A1 | 10/2009 | Patrick |
| 2009/0260007 | A1 | 10/2009 | Beaty et al. |
| 2009/0265707 | A1 | 10/2009 | Goodman et al. |
| 2009/0271324 | A1 | 10/2009 | Jandhyala et al. |
| 2009/0276771 | A1 | 11/2009 | Nickolov et al. |
| 2009/0287691 | A1 | 11/2009 | Sundaresan et al. |
| 2009/0293056 | A1 | 11/2009 | Ferris |
| 2009/0299905 | A1 | 12/2009 | Mestha et al. |
| 2009/0299920 | A1 | 12/2009 | Ferris et al. |
| 2009/0300057 | A1 | 12/2009 | Friedman |
| 2009/0300149 | A1 | 12/2009 | Ferris et al. |
| 2009/0300151 | A1 | 12/2009 | Friedman et al. |
| 2009/0300152 | A1 | 12/2009 | Ferris |
| 2009/0300169 | A1 | 12/2009 | Sagar et al. |
| 2009/0300210 | A1 | 12/2009 | Ferris |
| 2009/0300423 | A1 | 12/2009 | Ferris |
| 2009/0300607 | A1 | 12/2009 | Ferris et al. |
| 2009/0300608 | A1 | 12/2009 | Ferris |
| 2009/0300635 | A1 | 12/2009 | Ferris |
| 2009/0300641 | A1 | 12/2009 | Friedman et al. |
| 2009/0300719 | A1 | 12/2009 | Ferris |
| 2010/0042720 | A1 | 2/2010 | Stienhans et al. |
| 2010/0050172 | A1 | 2/2010 | Ferris |
| 2010/0057133 | A1 | 3/2010 | Williamson |
| 2010/0057831 | A1 | 3/2010 | Williamson |
| 2010/0058347 | A1 | 3/2010 | Smith et al. |

(56) References Cited

U.S. PATENT DOCUMENTS

| | | |
|---|---|---|
| 2010/0088205 A1 | 4/2010 | Robertson |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0174782 A1 | 7/2010 | Rose |
| 2010/0217864 A1 | 8/2010 | Ferris |
| 2010/0217865 A1* | 8/2010 | Ferris ............... H04L 12/5695 709/226 |
| 2010/0220622 A1 | 9/2010 | Wei |
| 2010/0287263 A1* | 11/2010 | Liu ..................... G06F 9/5088 709/221 |
| 2010/0299366 A1 | 11/2010 | Stienhans et al. |
| 2010/0306765 A1 | 12/2010 | DeHaan et al. |
| 2010/0306767 A1 | 12/2010 | DeHaan et al. |
| 2011/0004574 A1 | 1/2011 | Jeong et al. |
| 2011/0004916 A1 | 1/2011 | Schiffman et al. |
| 2011/0016214 A1 | 1/2011 | Jackson |
| 2011/0022812 A1* | 1/2011 | van der Linden .... G06F 9/5077 711/163 |
| 2011/0055398 A1 | 3/2011 | DeHaan et al. |
| 2011/0131134 A1 | 6/2011 | Ferris |
| 2011/0131306 A1 | 6/2011 | Ferris |
| 2011/0131315 A1 | 6/2011 | Ferris |
| 2011/0131335 A1 | 6/2011 | Spaltro et al. |
| 2011/0131499 A1 | 6/2011 | Ferris |
| 2011/0213687 A1 | 9/2011 | Ferris et al. |
| 2011/0213691 A1 | 9/2011 | Ferris et al. |
| 2011/0214088 A1 | 9/2011 | Sandru |
| 2011/0296370 A1 | 12/2011 | Ferris et al. |
| 2011/0313902 A1 | 12/2011 | Liu et al. |
| 2011/0320606 A1 | 12/2011 | Madduri et al. |
| 2012/0130873 A1 | 5/2012 | Morgan |
| 2012/0131594 A1 | 5/2012 | Morgan |
| 2012/0136989 A1 | 5/2012 | Ferris |
| 2012/0137001 A1 | 5/2012 | Ferris |
| 2012/0137002 A1 | 5/2012 | Ferris |
| 2012/0221454 A1 | 8/2012 | Morgan |
| 2012/0265884 A1 | 10/2012 | Zhang et al. |
| 2012/0304170 A1 | 11/2012 | Morgan |
| 2012/0311571 A1 | 12/2012 | Morgan |

OTHER PUBLICATIONS

USPTO, Office Action for U.S. Appl. No. 13/942,268, dated Dec. 8, 2015.

USPTO, Notice of Allowance for U.S. Appl. No. 12/942,268, dated Apr. 18, 2016.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

USPTO, Office Action for U.S. Appl. No. 12/390,617, dated Feb. 24, 2016.

USPTO, Final Office Action for U.S. Appl. No. 12/390,617, dated Sep. 24, 2015.

USPTO, Office Action for U.S. Appl. No. 12/390,617, dated Mar. 23, 2015.

USPTO, Advisory Action for U.S. Appl. No. 12/390,617, dated Nov. 19, 2014.

USPTO, Final Office Action for U.S. Appl. No. 12/390,617, dated Aug. 11, 2014.

USPTO, Office Action for U.S. Appl. No. 12/390,617, dated Jan. 24, 2014.

USPTO, Advisory Action for U.S. Appl. No. 12/390,617, dated Feb. 19, 2013.

USPTO, Final Office Action for U.S. Appl. No. 12/390,617, dated Dec. 5, 2012.

USPTO, Final Office Action for U.S. Appl. No. 12/390,617, dated Jul. 12, 2012.

USPTO, Advisory Action for U.S. Appl. No. 12/390,617, dated May 23, 2011.

USPTO, Final Office Action for U.S. Appl. No. 12/390,617, dated Mar. 9, 2011.

USPTO, Office Action for U.S. Appl. No. 12/390,617, dated Nov. 12, 2010.

"vRealize Operations Manager vApp Deployment and Configuration Guide", VMware, Inc., http://pubs.vmware.com/vrealizeoperationsmanager-62/topic/com.vmware.ICbase/PDF/vrealize-operations-manager-62-vapp-deploy-guide.pdf, 2016, 96 pages.

* cited by examiner

410

```
<!ELEMENT deployment_analysis (analysis_parameters+)>
<!ATTLIST deployment_analysis
application_ID NMTOKEN #REQUIRED
start_date CDATA #REQUIRED
start_time NMTOKEN #REQUIRED
requester_ID "foobar">

<!ELEMENT analysis_parameters (deployment_architecture, analysis_duration,
number_of_durations, processor_utilization+, network_traffic_level*,
storage_utilization*, software_license_info*)>

<!ELEMENT deployment_architecture (number_of_machines+, type_of_architecture+)>
<!ELEMENT number_of_machines (#PCDATA)>
<!ELEMENT type_of_architecture (physical | virtual | private_cloud | public_cloud)>

<!ELEMENT analysis_total_duration (#PCDATA)>
<!ATTLIST analysis_total_duration unit (second | minute | hour | day) "hour">

<!ELEMENT number_of_durations (#PCDATA)>

<!ELEMENT processor_utilization (duration_identifier+, utilization_level+)>
<!ELEMENT duration_identifier (#PCDATA)>
<!ELEMENT utilization_level (#PCDATA)>

<!ELEMENT network_traffic_level (duration_identifier+, traffic_level+)>
<!ATTLIST network_traffic_level unit (Mbit/s | Gbit/s | MB/s | GB/s) "Mbit/s">
<!ELEMENT duration_identifier (#PCDATA)>
<!ELEMENT traffic_level (#PCDATA)>

<!ELEMENT storage_utilization (duration_identifier+, storage_level+)>
<!ATTLIST storage_utilization
unit (KB | MB | GB) "MB"
storage_type (volatile | cache | persistent) #REQUIRED>
<!ELEMENT duration_identifier (#PCDATA)>
<!ELEMENT storage_level (#PCDATA)>

<!ELEMENT software_license_info (number_of_licenses+, license_identifier?)>
<!ELEMENT number_of_licenses (#PCDATA)>
<!ELEMENT license_identifier (#PCDATA)>
```

```
<?xml version="1.0" ?>
<!DOCTYPE deployment_analysis SYSTEM "deployment_analysis.dtd">
<deployment_analysis application_ID="APPLICATION A" start_date="02/24/2010" start_time=1200>
        <analysis_parameters>
                <deployment_architecture>
                        <number_of_machines>20</number_of_machines>
                        <type_of_architecture>private_cloud</type_of_architecture>
                </deployment_architecture>
                <analysis_total_duration>24</analysis_total_duration>
                <number_of_durations>24</number_of_durations>
                <processor_utilization>
                        <duration_identifier>1</duration_identifier>
                        <utilization_level>8%</utilization_level>
                </processor_utilization>
                <network_traffic_level unit=Mbit/s>
                        <duration_identifier>1</duration_identifier>
                        <traffic_level>753</traffic_level>
                </network_utilization>
                <processor_utilization>
                        <duration_identifier>2</duration_identifier>
                        <utilization_level>6%</utilization_level>
                </processor_utilization>
                <network_traffic_level unit=Mbit/s>
                        <duration_identifier>2</duration_identifier>
                        <traffic_level>878</traffic_level>
                </network_utilization>
                ...
                <processor_utilization>
                        <duration_identifier>24</duration_identifier>
                        <utilization_level>9%</utilization_level>
                </processor_utilization>
                <network_traffic_level unit=Mbit/s>
                        <duration_identifier>24</duration_identifier>
                        <traffic_level>488</traffic_level>
                </network_utilization>
        </analysis_parameters>
</deployment_analysis>
```

| DEPLOYMENT ARCHITECTURE ANALYSIS AND RECOMMENDATION ||||
|---|---|---|---|
| APPLICATION ID: APPLICATION A | START DATE: 02/24/2010 | START TIME: 12:00 | REQUESTER: foobar |

| DEPLOYMENT PARAMETERS |
|---|
| NUMBER OF MACHINES: 20<br>TYPE: PRIVATE CLOUD<br>TOTAL DURATION: 24 hr<br>PERIODS OF DURATION: 24 (EACH DURATION = 1 hr) |

| OBSERVED RESOURCE UTILIZATION |||
|---|---|---|
| DURATION PERIOD # | PROCESSOR UTILIZATION | NETWORK TRAFFIC LEVEL |
| 1 | 8% | 753 Mbit/s |
| 2 | 6% | 878 Mbit/s |
| ... | ... | ... |
| 24 | 9% | 488 Mbit/s |

| AVERAGE RESOURCE UTILIZATION: |
|---|
| PROCESSOR UTILIZATION: 7%<br>NETWORK TRAFFIC LEVEL: 790Mbit/s |

| RECOMMENDED DEPLOYMENT ARCHITECTURE |
|---|
| IT IS RECOMMENDED THAT APPLICATION A BE RUN ON VIRTUAL MACHINES INSTANTIATED IN A PUBLIC COMPUTING CLOUD BECAUSE APPLICATION A, OVER A PERIOD OF 24 HOURS:<br>    (1) CONSUMED ON THE AVERAGE LESS THAN 10% OF PROCESSOR POWER; AND<br>    (2) UTILIZED ON THE AVERAGE GREATER THAN 512 Mbit/s OF NETWORK BANDWIDTH. |

FIG. 4C

PROVISIONING CLOUD RESOURCES

RELATED APPLICATIONS

This application is a continuation of U.S. patent application Ser. No. 13/942,268 filed on Jul. 15, 2013, which is divisional of U.S. patent application Ser. No. 12/790,366 filed on May 28, 2010 and issued as U.S. Pat. No. 8,504,689. The entire contents of each of the above-referenced applications are incorporated by reference herein.

FIELD

This invention relates generally to cloud computing, and more particularly, to systems and methods for analyzing cloud deployment solutions taking into account the relative importance of various cloud resources.

BACKGROUND

The advent of cloud-based computing architectures has opened new possibilities for the rapid and scalable deployment of information technology services, including computing resources, software, and data, for myriad uses, such as virtual Web stores, media outlets, and other on-line sites or services. In general, a cloud-based architecture deploys a set of hosted resources such as processors, storage space, operating systems, software and other components that can be combined or strung together to form virtual machines. A user or customer can request the instantiation of a provisioned virtual machine, or set of machines, incorporating specific cloud resources from a central server or management system to perform intended tasks or run specific applications. For example, a user may wish to set up and instantiate a virtual server from the cloud to create a storefront to market products or services on a temporary basis, for instance, to sell tickets to an upcoming sports or musical performance. The user can lease or subscribe to the set of cloud resources (including software) needed to build and run the set of instantiated virtual machines on a comparatively short-term basis, such as hours or days, for their intended application.

Typically, when a user utilizes a cloud, the user must monitor or track the software applications executed in the cloud and/or the processes instantiated in the cloud. For example, the user may track the cloud processes to ensure that the correct cloud processes have been instantiated, that the cloud processes are functioning properly and/or efficiently, that the cloud is providing sufficient resources to the cloud processes, etc. Due to the user's requirements and usage, including third-party usage, of the cloud, the user may have many applications and/or processes instantiated in a cloud and may be utilizing multiple independent clouds to support the cloud processes. As such, the user may have difficulty determining a satisfactory deployment architecture in the cloud, especially as the applications and/or processes are dynamically instantiated or terminated over time. Additionally, the user may have difficulty tracking the applications and/or processes utilized by the cloud processes. For example, as the applications and/or processes run in the cloud(s), the cloud processes may spawn new cloud processes. As such, the initial deployment architecture hosting the user's applications and/or processes may no longer be satisfactory for, or even capable of, supporting the user's applications and/or processes.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4A illustrates an exemplary data definition, according to various embodiments;

FIG. 4B illustrates an exemplary data set generated by the decision system in compliance with the data definition, according to various embodiments;

FIG. 4C illustrates an exemplary report generated by the decision system, according to various embodiments;

DETAILED DESCRIPTION OF EMBODIMENTS

Figure 1:
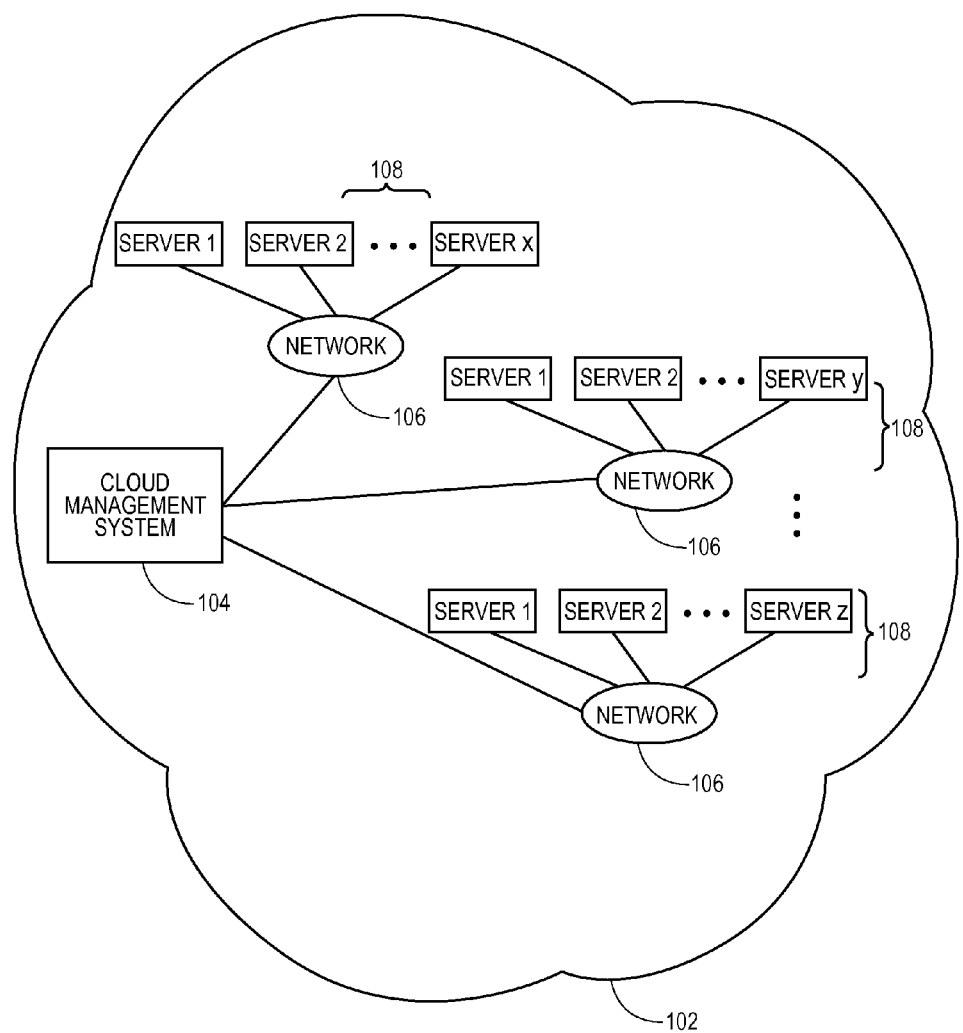
FIG. 1 illustrates an exemplary overall cloud system architecture in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, many other types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for measuring usage of and intelligently deploying cloud computing resources. More particularly, embodiments relate to platforms and techniques in which a decision system can gather resource usage data of applications and/or processes running in a cloud computing environment, analyze the usage data associated with the running applications and/or processes, including taking into account various importance levels for various resources and/or functionality, and provide customized deployment architectures that address the various importance levels of the various resources.

In certain embodiments, a decision system can be configured to provide recommendations, suggestions, alternatives, options, assignments and/or implementations for customized cloud resource deployment architectures to users of a cloud computing environment. In particular, the decision system can be configured to obtain cloud resource usage data representing cloud service consumption by a specific user. Among various embodiments, the cloud resource usage data can be provided by the user, gathered by the decision system, retrieved from previously recorded resource usage parameters, retrieved from a computer readable storage medium storing usage data of similar users, or obtained some other way. In embodiments where the decision system gathers the usage data, the decision system can be configured to monitor the applications executed, activities engaged in, and/or computing processes instantiated in the cloud that are associated with the user. For example, the decision system can be configured to monitor the cloud services and resource capacity consumed by the user in the form of number and type of computing processes instantiated, running time of applications and/or computing processes, cloud processing resources used, cloud storage resources used, cloud software programs utilized by the computing processes, etc.

In accordance with certain embodiments, once the resource usage data is initially collected, the decision system can be configured to determine a baseline requirement for cloud resources from the resource usage data. The baseline requirement for cloud resources can be recorded in a format defined using a data definition accessible to other computing resources in the cloud. In some embodiments, the decision system can be configured to provide reports to the user describing the baseline requirement for cloud resources determined from the user's applications executed and/or processes instantiated in the cloud.

In some embodiments, the decision system includes configurable logic or variables that can be configured to assign different levels of importance to one or more cloud resources included in the resource usage data. For example, the configurable logic or variables may be adjusted so that obtaining a specified level of processor cycles per hour is more important than long-term data storage space.

In accordance with certain embodiments, the decision system can be configured to apply the configurable logic to the baseline requirement for cloud resources and produce an adjusted requirement for cloud resources. The adjusted requirement can reflect the different levels of importance of the resources parameters that make up the resource usage data.

In certain embodiments, the decision system can be configured to determine a set of cloud resources that are available and that satisfy the adjusted requirement for cloud resources. In some embodiments, the decision system can be configured to analyze the adjusted requirement for cloud resources and the available cloud resources to generate a solution that closely, or best, (or in some cases optimally), matches the required cloud resources to the available cloud resources. In some embodiments, the analysis may be based on rules for customizing resource deployment architectures in the cloud, configuration data reflecting the user's current deployment architecture, and/or a software license requirement associated with the user's applications.

In certain embodiments, after determining a set of cloud resources that are available and that satisfy the adjusted requirement for cloud resources, the decision system can be configured to assign the determined set of cloud resources to the user. The determined set of cloud resources may be a customized deployment architecture within one or more clouds that meet the user's adjusted requirement for cloud resources, taking into account the differences in importance of certain resources over other resources. In some embodiments, the decision system can present the assigned set of cloud resources (e.g., a customized cloud resource deployment architecture) to the user for approval before deploying the set of cloud resources in the cloud computing environment to run the user's application(s) and process(es).

By generating customized cloud resource deployment architectures that take into account the relative importance of various resources, the decision system can provide cloud resources that satisfy the resource needs of a user's applications and/or processes, where the resource needs are more complex than merely an equal need for each resource. In addition, the decision system can adjust the cloud resources assigned to the user as the relative importance of various resources changes over time. As such, the decision system allows the computing processes in the cloud to run properly and efficiently on a set of cloud resources that may dynamically change in response to factors such as user preference, trends in usage of the computing processes and/or deployed cloud resources, predicted future usage of the computing processes and/or deployed cloud resources, past usage patterns of the computing processes and/or deployed cloud resources, and other factors.

FIG. 1 illustrates an overall cloud computing environment, in which systems and methods for the management and deployment of cloud resources, including collections of resources forming cloud-based virtual machines, can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components and services (cloud resources) needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power resources for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 and/or other hardware or software resources used to support the cloud 102 along with its instantiated virtual machines can be managed by a cloud management system 104. The cloud management system 104 can comprise a dedicated or centralized computing system, such as a server, and/or other software, hardware, and network tools that communicate via one or more networks 106, such as the Internet or other public or private network with all sets of resource servers 108 to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource(s) being requested. The cloud management system 104 can then identify a collection of resources needed to instantiate that machine or resource. In determining the needed cloud resources, the cloud management systems can take into account the relative importance of certain resources in comparison to other resources and adjust the composition of the collection of cloud resources to reflect resource importance.

In embodiments, the user's instantiation request can specify a variety of parameters defining the operation of the set of virtual machines to be invoked. For example, if the instantiation request is for virtual transaction servers used to support temporary, special-event Web storefronts, or other short-term transaction site, then the instantiation request can, for example, specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power capacity or input/output (I/O) throughput capacity the user wishes to be available to each instance of the virtual machine or other resource. In some embodiments, the requesting user can, for instance, specify a service level agreement (SLA) acceptable for their application. Other parameters and settings can be used. In other embodiments, the user's request can specify resource importance levels, so that some resource(s) are designated as more important in comparison to other resources. For example, a user deploying a set of virtual customer support workstations may place a greater weight of importance on a communications bandwidth resource and/or an uptime resource, in comparison to a lower importance memory allocation resource and/or a lower importance operating system version resource. One skilled in the art will realize that the user's request can likewise include combinations of the foregoing exemplary parameters, and others.

In some embodiments, when the request to instantiate a set of virtual machines or other resources has been received and the necessary resources to build that machine or resource have been identified and adjusted to reflect the relative importance of various cloud resources, the cloud management system 104 can communicate with one or more set of resource servers 108 to locate resources that are available to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements and available cloud resources identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth capacity, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of available servers in the set of resource servers 108 that match to some extent the instantiation request for each component needed to build the virtual machine or other resource. The cloud management system 104 can then coordinate the integration of the completed group of servers from the set of resource servers 108, to assign, build, and launch the requested set of virtual machines or other resources for the requesting user. The cloud management system 104 can track the combined group of servers selected from the set of resource servers 108, and/or other distributed resources that are dynamically or temporarily combined, to produce and manage the user-requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set of resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth capacity, or applications or other software prepared to be served.

Figure 2:
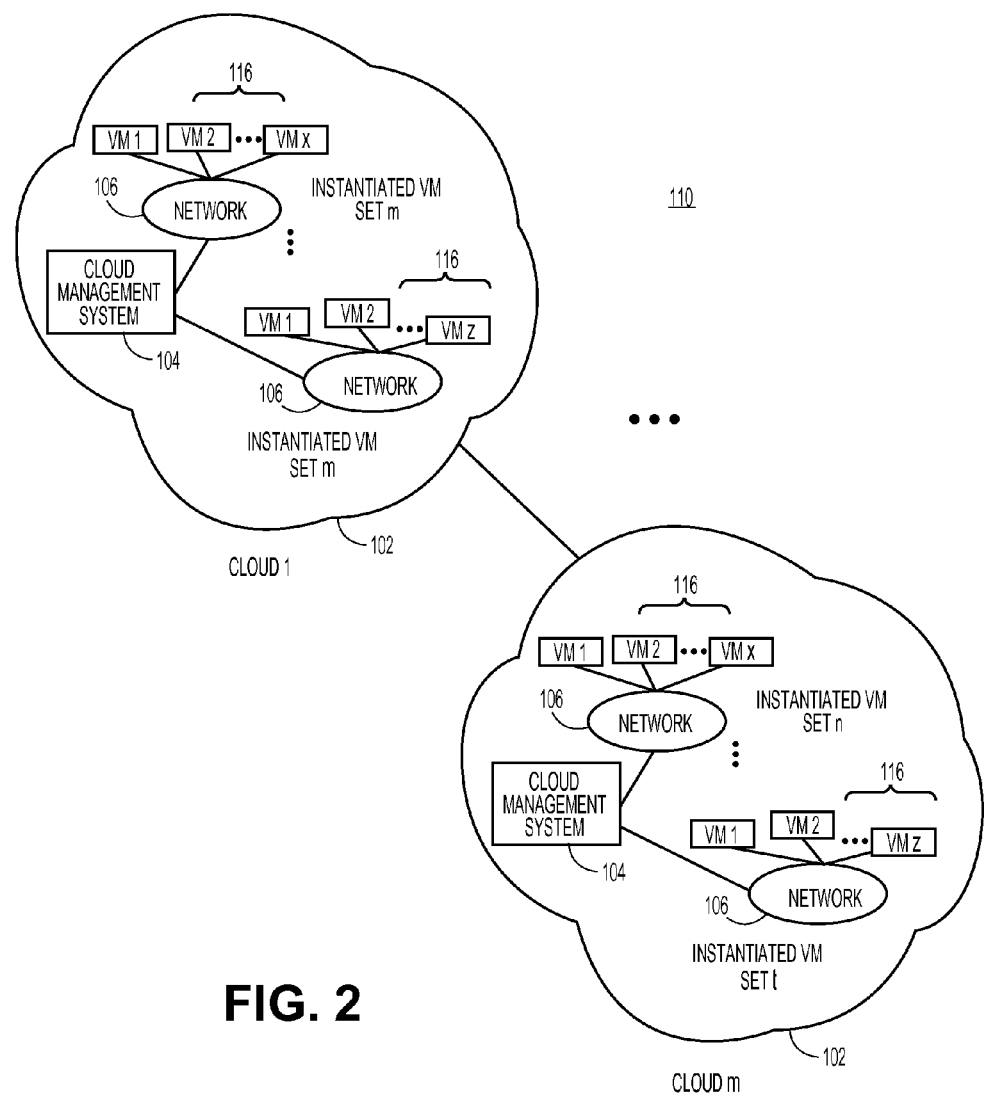
FIG. 2 illustrates an exemplary overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to third-party users (e.g., customers) on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are typically hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates, and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. Similarly, the resources assigned to a virtual machine may change over time with changes to the importance of a resource to the operation of the virtual machine, changes to the importance of a resource to the user, changes to the importance of a resource with respect to the anticipated usage of the virtual machine, or other changes to the importance of a resource. In embodiments, the various sets of resource servers that are accessed by the cloud management system 104 to support a set of instantiated virtual machines 116 or processes can change or be substituted, over time. The type and operating characteristics of the set of instantiated virtual machines 116 can change or can remain constant or virtually constant, since instances are assembled from abstracted resources that can be selected and maintained from diverse sources based on uniform specifications.

In some embodiments, the various sets of cloud resources and resource servers that support a set of instantiated virtual machines 116 or processes changes over time as new clouds become available. In these embodiments, the resources, services, and/or capabilities offered by a new cloud are compared to the resource requirements of an existing user's application(s)/process(es) as indicated, for example, in the user's recorded usage or utilization data. If the new cloud offers provides the resources, services, and/or capabilities required by the user and also provides some advantage compared to the cloud presently hosting the user's application(s)/process(es), then switching the user's application(s)/process(es) (or a subset) to the new cloud can recommended or implemented. This process could be performed for more than one user, such that several different users may benefit from being hosted on the new cloud.

As an example, consider a case where utilization data shows that a user consumes 500 virtual instances, peaking at intervals of 48 hours, with a relatively low level of network traffic capacity consumption and storage capacity consumption, and a new cloud begins offering resource sets designed to support high-compute cycle consumption combined with short-term data storage, for a discounted price. In this case, a decision system can recommend assigning, or assign, the user's computing processes to the new cloud, gaining the benefit of the discounted price. The decision system may recommend a switch to the new cloud for resource-related reasons as well. For example, the decision system may recommend a switch to the new cloud because the new cloud offers additional processing capacity that the user is projected to need.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 (cloud 1) can also interact with a set of instantiated virtual machines or processes generated in a second, third or further cloud 102 (cloud m) The cloud management system 104 of a first cloud 102 (cloud 1) can interface with the cloud management system 104 of a second cloud 102 (cloud m), to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, group (e.g., a department), corporation, organization, or other entity. In embodiments, the user can be or include another virtual machine, application or process. In further embodiments, multiple users or entities can share the use of a set of virtual machines or other resources.

Figure 3:
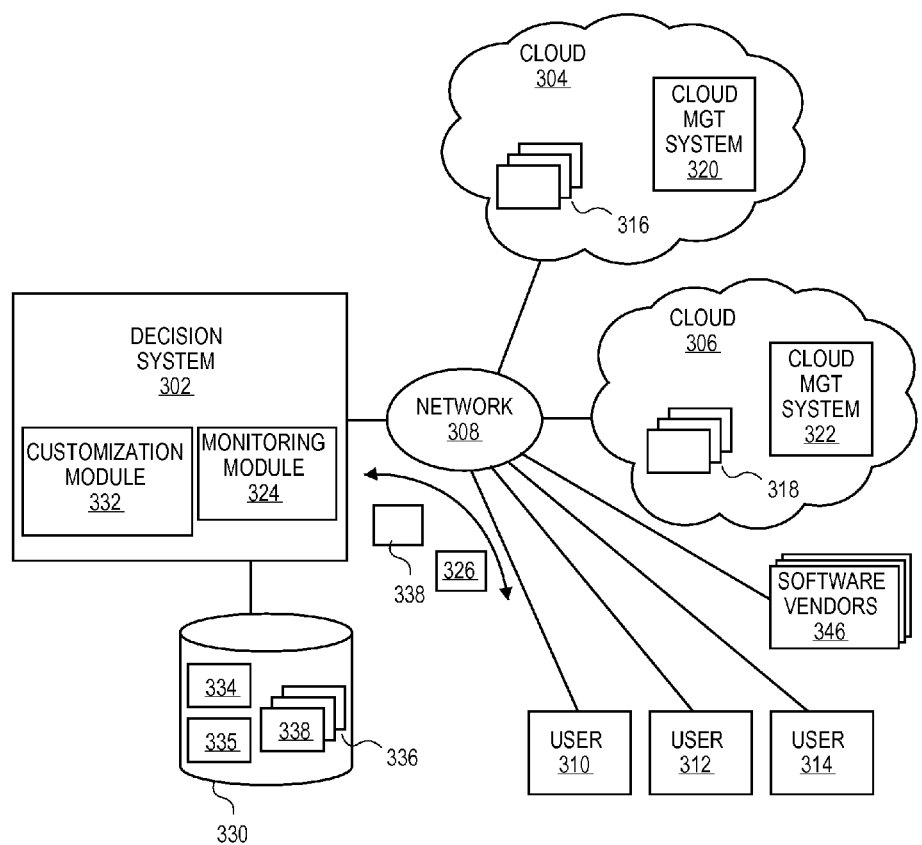
FIG. 3 illustrates an exemplary overall system in which a decision system can analyze data associated with applications and/or processes running in a cloud computing environment and provide customized deployment architectures, according to various embodiments.

FIG. 3 illustrates exemplary aspects in which a decision system 302 can communicate with clouds 304 and 306, via one or more networks 308, according to various embodiments. While FIG. 3 illustrates various components of the decision system 302 and the clouds 304 and 306, one skilled in the art will realize that components can be added or removed.

In embodiments, one or more users 310, 312, and 314 can utilize one or more of the clouds 304 and 306 to support computing processes of the user 310, 312, and 314. For example, the user 310 can utilize the cloud 304 to support computing processes 316 and can utilize cloud 306 to supporting computing processes 318. The computing processes 316 and 318 can be any type of computing processes, such as virtual machines, software appliances, software programs (e.g. OS, applications, and the like), etc. The users 310, 312, and 314 can be any type of entity, such as individual users, groups of individuals (such as a department), corporations, companies, universities, and the like, that utilizes the clouds 304 and 306 to support computing processes. While FIG. 3 will be described with reference to user 310, one skilled in the art will realize that the processes and methods can be applied to any of the users 310, 312, and 314 or any other users. Additionally, while FIG. 3 illustrates users 310, 312, and 314, one skilled in the art will realize that methods and processes can apply to any number of users.

In embodiments, the clouds 304 and 306 can be any type of cloud computing environments, such as the cloud computing environments described above in FIGS. 1 and 2. As described above, the clouds 304 and 306 can include any number of computing systems to support the computing processes in the cloud. The computing systems can be any type of computing systems capable of supporting computing processes, such as servers, laptops, desktops, and the like. The computing systems can include a number of hardware resources, which are used to support the computing processes (e.g. virtual machines, software appliances, processes and the like) in the clouds 304 and 306, such as processors, memory, network hardware and I/O bandwidth, storage devices, etc. Additionally, the clouds 304 and 306 can include a cloud management system 320 and 322, respectively. The cloud management systems 320 and 322 can be supported by the computing resources of the clouds 304 and 306, respectively.

In embodiments, the cloud 304 and/or 306 can be operated and controlled by any number of entities. For example, the cloud 304 and/or the cloud 306 can be owned and/or operated by a cloud vendor, such as Amazon™, Inc., in order to provide the services of the cloud 304 and/or the cloud 306 to subscribers and customers. Likewise, for example, the cloud 304 and/or the cloud 306 can be owned and/or operated by one or more of the users 310, 312 and 314, and the resources of the cloud 304 and/or the cloud 306 can be used by the entity, internally, to support various computing processes. As such, in either case, the cloud 304 and the cloud 306 can be configured to include hardware, described above, and software resources to support computing processes. For example, if the cloud 304 and/or the cloud 306 is operated by a cloud vendor, the software resources can include operating systems, such as a distribution of the Linux™ operating system provided by Red Hat™ Corporation, and various software programs requested or typically desired by subscribers, such as middleware applications, web hosting applications, electronic mail (email) applications, and the like. Likewise, for example, if the cloud 304 and/or the cloud 306 is operated by an entity for internal use, the software resources can include software resources required to support the specific internal uses. For instance, the cloud can be utilized by a corporation to perform simulations on a product and the software resources can include operating systems and application programs to run the simulations.

In embodiments, the one or more networks 308 can be or include the Internet, or other public or private networks. The one or more or more networks 308 can be or include wired, wireless, optical, and other network connections. One skilled in the art will realize that the one or more networks 308 can be any type of network, utilizing any type of communication protocol, to connect the computing systems.

In embodiments, due to the dynamics of the computing processes 316 and 318, the user 310 can desire to actively monitor the computing processes 316 and 318. For instance, the user 310 can desire to monitor the computing processes 316 and 318 to ensure that the appropriate computing processes are running and functioning properly. Likewise, the user 310 can desire to monitor the computing processes 316 and 318 to determine the usage of the resources of the clouds 304 and 306 for billing and other purposes. Additionally, the computing processes 316 and 318 can spawn new computing processes in the clouds 304 and 306, which the user 310 can desire to monitor.

In embodiments, the decision system 302 can be configured to monitor the clouds 304 and 306 for the one or more users 310, 312, and 314. In particular, the decision system 302 can be configured to monitor the computing process(es)

associated with the users 310, 312, and 314 and supported by the clouds 304 and 306. The decision system 302 can be configured to subscribe the users 310, 312, and 314 to the monitoring services provided by the decision system 302. Once subscribed, the decision system 302 can be configured to receive access information from the users 310, 312, and 314. The decision system 302 can be configured to utilize the access information to access and communicate with the clouds 304 and 306 in order to monitor the computing processes supported by the clouds 304 and 306 and to collect or obtain information about the computing processes, such as data about usage of cloud resources that is attributable to each of users 310, 312, and 314. Additionally, the decision system 302 can be configured to report any information collected while monitoring the users 310, 312, and 314.

In embodiments, the decision system 302 can be operated by an entity that provides the monitoring services to the users 310, 312, and 314. The monitoring services can be provided to the users 310, 312, and 314 for a fee. The decision system 302 can be supported by one or more computing systems, such as servers, laptops, desktops, and the like. The decision system 302 can include or utilize conventional components of a computing system, such as processors, memory, network interfaces, storage devices, etc.

In embodiments, to monitor the computing processes 316 and 318, the decision system 302 can be configured to include a monitoring module 324. The monitoring module 324 can be configured to cooperate and communicate with the users 310, 312, and 314, to subscribe the users 310, 312, and 314 to the monitoring services, and to report any gathered information to the users 310, 312, and 314. The monitoring module 324 can be configured to monitor one or more aspects of the running processes based on one or more predefined parameters or a set of parameters defined by the user 310. A parameter may reflect or correspond to a level of usage or to consumption of a cloud resource. The parameters can include, for example, processing hardware utilization data (such as processor utilization data and memory utilization data), software application utilization data, operating system software utilization data, resource reliability data (such as processor up time), network bandwidth utilization data, storage utilization data, etc. Likewise, the monitoring module 324 can be configured to cooperate and communicate with the clouds 304 and 306 to monitor computing processes supported by the cloud 304 and 306. In one embodiment, the monitoring module 324 can be implemented as a software program that is configured to execute on the decision system 302. Likewise, the monitoring module 324 can be implemented as a portion of other software programs configured to execute on the decision system 302, or implemented in hardware. Regardless of implementation, the monitoring module 324 can be configured to include the necessary logic, commands, instructions, and protocols to perform the relevant processes described below. In some implementations, the monitoring module 324 can be written in any type of conventional programming language such as C, C++, JAVA, Perl, and the like. Additionally, the monitoring module 324 can be stored in computer readable storage devices or non-transitory media (CD, DVD, hard drive, portable storage memory, etc.) whether local to the decision system 302 or remotely located.

In some embodiments, once the user 310 has subscribed, the monitoring module 324 can be configured to generate and maintain a set 336 of usage or utilization data 338. Each utilization data 338 in the set 336 can be configured to store an identification of the running processes, such as computing processes 316 and 318, the user associated with the running processes, and any information collected during the monitoring of the computing processes 316 and 318. The monitoring module 324 can maintain the set 336 of utilization data 338 in a repository 330, such as a database. The repository 330 can be stored in computer readable storage devices or non-transitory media (CD, DVD, hard drive, portable storage memory, etc.) whether local to the decision system 302 or remotely located.

In embodiments, once the user 310 is subscribed, the monitoring module 324 can be configured to communicate with the clouds 304 and 306 to monitor the computing processes 316 and 318. For example, the monitoring module 324 can be configured to retrieve the utilization data 338 associated with the user 310 and/or the computing processes 316 and 318 associated with the user 310. To retrieve the utilization data 338, the monitoring module 324 can be configured to include the necessary logic, commands, instructions, and protocols to search the set 336 of utilization data 338 and to retrieve the utilization data 338 and the access information for the user 310. For instance, the monitoring module 324 can be configured to include the necessary queries and commands to communicate with and retrieve information from the repository 330 regarding the cloud resources used by processes 316 and 318 associated with the user 310.

The monitoring module 324 can be configured to monitor the computing processes 316 and 318 and collect various information, such as information regarding usage of cloud resources by the computing processes 316 and 318, details of the computing processes 316 and 318, and the like. For example, the monitoring module 324 can be configured to collect information, such as type and number of hardware resources of the clouds 304 and 306 utilized by the computing processes 316 and 318 (amount of processing cycles utilized, amount of network bandwidth utilized, amount of storage space utilized, amount of memory utilized, etc.), the type and number of software resources of the clouds 304 and 306 utilized by the computing processes 316 and 318, the duration for which the hardware and software resources are utilized, the current fees for using the clouds 304 and 308, and the like. For an additional example, the monitoring module 324 can be configured to collect information about details of the computing processes 316 and 318, themselves, such as number and type of the computing processes 316 and 318 instantiated, start time and duration of the computing processes 316 and 318, software programs utilized by the computing processes 316 and 318, and the like.

In embodiments, in order to monitor and collect information about the computing processes 316 and 318, the monitoring module 324 can be configured to communicate with the cloud management systems 320 and 322 of the clouds 304 and 306, respectively. For example, the monitoring module 324 can be configured to communicate with the cloud management systems 320 and 322 in order to collect information about the usage of the resources of clouds 304 and 306. Likewise, the monitoring module 324 can be configured to communicate with the computing processes 316 and 318 to collect information about the details of the computing processes 316 and 318 and about the resources used by computing processes 316 and 318. For example, the monitoring module 324 can be configured to communicate with virtual machine monitors supporting virtual machines, with the virtual machines directly, with software appliances, with the software programs, and the like.

In embodiments, to communicate with the clouds 304 and 306, the monitoring module 324 can be configured to establish a connection with the cloud 304 and 306 via the network 308. In particular, the monitoring module 324 can be configured to establish a connection with the cloud management systems 320 and 322 and/or a connection to the computing processes 316 and 318. To achieve this, the monitoring module 324 can be configured to include the necessary logic, instructions, commands, and protocols to communicate with the cloud management systems 320 and 322 and/or via a connection to the computing processes 316 and 318 via network 308. For example, the monitoring module 324 can be configured to establish a connection using network protocols, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the monitoring module 324 can be configured to monitor the computing processes 316 and 318 periodically for a specified duration and/or upon the occurrence of events. For example, the monitoring module 324 can be configured to monitor the computing processes 316 and 318 upon the subscription of the user 310 and periodically (every hour, once a day, etc.) while the user 310 is subscribed.

In embodiments, once information, such as cloud resource usage data, about the computing processes 316 and 318 is collected, the monitoring module 324 can be configured to store the collected information in the utilization data 338 associated with a user, such as user 310. As such, the monitoring module 324 can be configured to classify the collected information and store the information in the utilization data 338. To achieve this, the monitoring module 324 can be configured to include the necessary logic, commands, instructions, and protocols to sort and classify the collected information and store the sorted and classified information in the utilization data 338.

In embodiments, when the information is collected, the monitoring module 324 can be configured to generate reports to provide the collected information to the user 310. The monitoring module 324 can be configured to generate the report in any format to display the collected information to the user 310 or for other purposes. To achieve this, the monitoring module 324 can include the necessary logic, commands, instructions, and protocols to retrieve the collected information from the utilization data record 338 and organize the collected information into reports.

In embodiments, the monitoring module 324 can be configured to generate and provide the reports to, for example, the user upon the occurrence of any number of events. For example, the monitoring module 324 can be configured to provide the reports upon request of the user 310 and/or periodically. The monitoring module 324 can be configured to receive the request for the reports via an interface 326. Likewise, the monitoring module 324 can be configured to provide the reports via the interface 326. Additionally, the monitoring module 324 can provide the reports to the user 310 via the network 308 utilizing any type of network protocol, such as Internet protocol (IP), user datagram protocol (UDP), transmission control protocol (TCP), hypertext transfer protocol (HTTP), file transfer protocol (FTP), electronic mail (email) protocols, or any other type of known or proprietary network protocol.

In embodiments, the decision system 302 can be configured to utilize the information collected during the monitoring to provide other services to the users 310, 312, and 314. In particular, the decision system 302 can be configured to verify that the software programs utilized by the computing processes 316 and 318 instantiated in the clouds 304 and 306 comply with software license requirements. For example, as the computing processes 316 and 318 run, the computing processes 316 and 318 can change over time. For instance, the computing processes 316 and 318 can spawn new computing processes which can utilize new instances of software programs.

In embodiments, to generate customized deployment architectures that account for the relative importance of cloud resources, the decision system 302 can be configured to include a customization module 332. In some embodiments, the customization module 332 can be implemented as a software program with configurable logic that executes on the decision system 302. Likewise, the customization module 332 can be implemented as a portion of other software programs, such as monitoring module 324, including configurable logic that executes on the decision system 302. In either case, the customization module 332 can be configured to include the necessary logic, adjustable rules, commands, instructions, and protocols to perform the processes and functions described below. In some implementations, the customization module 332 can be written in any type of conventional programming language such as C, C++, JAVA, Perl, and the like. Additionally, the customization module 332 can be stored in computer readable storage devices or non-transitory media (CD, DVD, hard drive, portable storage memory, etc.) whether local to the decision system 302 or remotely located.

In embodiments, the customization module 332 can be configured to generate and to maintain a set of deployment rules 334. The set of deployment rules 334 can be configured to store rules, algorithms, decision logic, or best practices for deploying resources in a computing cloud environment such as the clouds 304 and 306. The set of deployment rules 334 can be configured to include requirements for software programs provided by the owners and operators of the clouds 304 and 306. The set of deployment rules 334 can also be configured to include resources available in the clouds 304 and 306. Likewise, the set of deployment rules 334 can be configured to include requirements or preferences for software programs provided by software vendors 346, which can be software vendors independent of the decision system 302 and the clouds 304 and 306, such as independent software vendors (ISVs).

In embodiments, the set of deployment rules 334 can be configured in any format and can include any information that provides the necessary logic, such as algorithms and/or heuristics, for generating customized deployment architectures that account for the relative importance of cloud resources, which may be based on the information collected during the monitoring of the computing processes 316 and 318. For example, the set of deployment rules 334 can include any number rules based on the resource utilization of running processes 316 and 318. For instance, a rule can specify that deployment architecture must include cloud resources sufficient to meet the peak requirement for each resource that is recorded in utilization data 338. For another instance, a rule can specify that if an application's processor capacity utilization over the course of a period of time is less than ten percent, then the application is an excellent candidate for virtualization. Another rule can specify that if an application has a high network bandwidth capacity requirement, then the application is an excellent candidate to be run on a public cloud. The customization module 332 can be configured to store the set of deployment rules 334 in the repository 330.

In certain embodiments, the customization module 332 can be configured to utilize and to maintain a set of resource importance data 335 representing the relative importance or significance of each cloud resource to a user and/or to the applications or processes associated with a user. As shown, the set of resource importance data 335 may be stored in repository 330. In one embodiment, the set of resource importance data 335 can include weighting data for cloud resources needed by the applications or processes associated with a user, where the weighting data associated with a cloud resource indicates that resource's relative importance among the set of needed resources. In this embodiment, the weighting data can be used by customization module 332 to deploy cloud resources to support the applications or processes associated with a user. Different cloud resources can be assigned different matching or decision weights, depending on factors such each resource's significance in the usage history of the user's applications/processes, each resource's anticipated future usage, user preference, etc. For example, a set of resource importance data 335 for a user deploying a set of virtual customer support workstations may include data indicating a greater importance weight on communications bandwidth capacity and processor up time, and a lower importance weight on memory allocation and operating system version. When customization module 332 determines a set of cloud resources to be deployed in support of the virtual customer support workstations, it can adjust the set of resources to ensure adequate communications bandwidth and processor up time, even though the adjustment may cause a tradeoff in the form of a lesser amount of memory allocation and the use of an less desirable (e.g., older) operating system version. In such embodiments, customization module 332 chooses a deployment configuration by giving preference to the resources identified as being more important over the resources identified as being less important.

In embodiments, the set of resource importance data 335 can be configured in any format and can include any information that represents the relative importance or significance of various cloud resources, such as weights, factors, ratings, categories, etc. For example, the set of resource importance data 335 can include weighting factors reflecting the relative amount of usage of various cloud resources during past monitoring of running processes 316 and 318. For instance, a weighting factor can indicate that it is of low importance for an application to have 500 megabytes of memory capacity available to it because the application's memory usage over the course of a period of time hits a maximum of 500 Mbytes only one percent of the time. Another weighting factor can indicate high importance for the application to have 200 megabytes of memory capacity available to it because the application's memory usage over the course of a period of time is at 200 megabytes or less 97 percent of the time. For another instance, a weighting factor can indicate that memory capacity is a low-importance resource that can be traded off in favor of gaining high-importance processing capacity resource. In some embodiments, the importance of various cloud resources (e.g., represented by weights in resource importance data 335) can change over time as a function of ongoing updating of the usage history of an application/process, or as a function of other factors, such as user input. Correspondingly, the set of cloud resources output by decision system 302 as recommendations and/or assignments to support a user and the user's applications/processes can change over time as well.

FIG. 4A illustrates an exemplary data definition 410 for defining the format of data generated and received by the decision system 302. While FIG. 4A illustrates a data definition in the form of a document type definition, one skilled in the art will realize that any type of data definitions can be used. As illustrated, the data definition 410 can include metadata for data utilized by the decision system 302 to generate customized deployment architectures and to account for the relative importance of cloud resources, such as an identifier of a running application, a start date and time, a requester identifier, and data parameters such as a configuration of a current deployment architecture (e.g., a number of machines), a time duration, a number of time intervals, a processor utilization, a network traffic level, a storage utilization, a software license information, and the like.

FIG. 4B illustrates an exemplary data set 420 generated by the decision system 302 in accordance to the data definition shown in FIG. 4A. As illustrated, the data set 420 can include data utilized by the decision system 302 to generate customized deployment architectures that account for the relative importance of cloud resources, such as an identifier of a running application, a start date and time, a requester identifier, and data parameters such as a configuration of the current deployment architecture (e.g., a number of machines), a time duration, a number of time intervals, a processor utilization percentage during each interval, a network traffic level during each interval, a storage utilization level during each interval, software license information, and the like.

A historical usage data set, such as data set 420, can be used to determine a baseline requirement for cloud resources associated with a particular application or process, or the applications/processes associated with a particular user. The baseline requirement can include data, such as resource attributes or resource parameters, that represent the cloud resources needed by an application or process. For example, the usage data in data set 420 may indicate that the peak network traffic level measured during 24 duration periods was 878 Mbit/s. Based on this peak, the baseline requirement for the application represented by data set 420 may include a parameter indicating that the network traffic level resource requirement is 878 Mbit/s; in this case, the baseline requirement is a requirement for enough cloud resources to meet the peak demand for network traffic.

Continuing this example, without adjustment, decision system 302 can generate a set of cloud-based resources for this application that includes web network traffic resources sufficient to provide 878 Mbit/s of capacity at any time. In embodiments, the decision system 302 can employ configurable logic, such as configurable deployment rules 334 and/or resource importance data 335, that adjusts the baseline resource requirements according to the importance of a resource to the application and/or the user. For example, the baseline requirement for network traffic capacity resources can be reduced such that the deployment rules generate a deployment architecture having a set of cloud resources that includes less than 878 Mbit/s of web network traffic capacity in order to achieve a gain in capacity for another cloud resource, for example high processing capacity, where the requirement for the other cloud resource (high processing capacity) is deemed more important than the requirement for web network traffic capacity. Assuming for this example that both high processing capacity and 878 Mbit/s of web network traffic capacity are not both available together in one architecture, the more-important high processing capacity is obtained at the expense of the desired, but less-important, web network traffic capacity by choosing an architecture that has high processor capacity, but less than 878 Mbit/s of web network traffic capacity.

In embodiments, the decision system 302 can be configured to provide a report 430, an exemplary instance of which is illustrated in FIG. 4C, to advise the user of resource usage information, deployment architecture options, and parameters. Deployment options can include computing resources, such as, for example, one or more physical machines, one or more virtual machines, one or more public clouds, one or more private clouds, or any combination thereof. One skilled in the art will realize that the other deployment options or types of computing resources can be used. The recommended deployment architecture can be affected by the relative importance of various cloud resources, such that the recommended architecture is different than it would have been had the relative importance not been taken into account.

While FIG. 3 shows the decision system 302 as maintaining a set of deployment rules 334 and an instance of resource importance data 335, one skilled in the art will realize that the decision system 302 can maintain multiple sets of deployment rules and resource importance data. Additionally, while FIG. 3 describes the decision system 302 accessing the set of deployment rules 334 and resource importance data 335, one skilled in the art will realize that the decision system 302 can be configured to allow other systems to access the set of deployment rules 334 and resource importance data 335, for example, by providing one or more APIs. In some embodiments, the resource importance data 335 for a given application or user may change over time.

Figure 5:
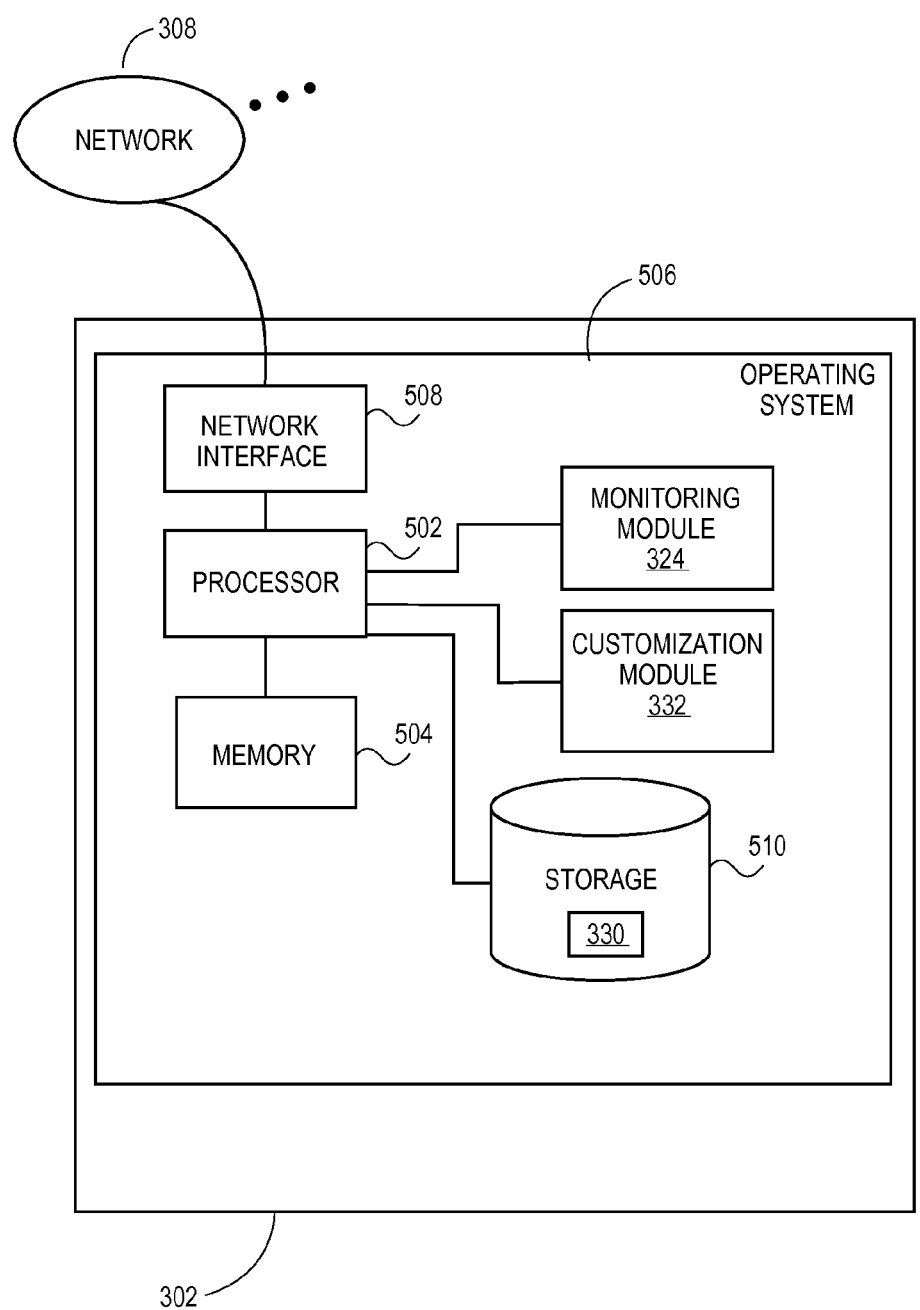
FIG. 5 illustrates an exemplary hardware computing system configuration capable of implementing a decision system, according to various embodiments.

FIG. 5 illustrates an exemplary diagram of hardware and other resources that can be incorporated in the decision system 302, which can implement the monitoring module 324 and the customization module 332, and be configured to communicate with the clouds 304 and 306 via one or more networks 308, according to various embodiments. In embodiments as shown, the decision system 302 can comprise a processor 502 communicating with a memory 504, such as electronic random access memory, operating under control of or in conjunction with an operating system 506. Operating system 506 can be, for example, a distribution of the Linux™ operating system, such as SELinux, the Unix™ operating system, or other open-source or proprietary operating system or platform. Processor 502 also communicates with one or more computer readable storage medium 510, such as hard drives, optical storage, and the like, which can store the repository 330. Processor 502 further communicates with network interface 508, such as an Ethernet or wireless data connection, which in turn communicates with one or more networks 308, such as the Internet or other public or private networks.

Processor 502 also interfaces with the monitoring module 324 and the customization module 332 to execute control logic and deployment rules 334 and allow for monitoring computing processes as described above and below. Execution of deployment rules 334 can be influenced or adjusted by the resource importance data 335, such that the calculated requirements for cloud resources needed by an application, process, or user, and the final deployment architecture(s) determined by decision system 302 take into account a heightened need or preference for certain cloud resources over other cloud resources. Other configurations of the decision system 302, associated network connections, and other hardware and software resources are possible.

While FIG. 5 illustrates the decision system 302 as a standalone system including a combination of hardware and software, the decision system 302 can include multiple systems operating in cooperation. The monitoring module 324 and the customization module 332 can be implemented as a software application or program capable of being executed by the decision system 302, as illustrated, or other conventional computer platforms. Likewise, the monitoring module 324 and the customization module 332 can also be implemented as a software module(s) or program module(s) capable of being incorporated into other software applications and programs. In either case, the monitoring module 324 and the customization module 332 can be implemented in any type of conventional, proprietary or open-source, computer language. When implemented as a software application or program code, the monitoring module 324 and the customization module 332 can be stored in a computer readable storage medium, such as storage 510 accessible by the decision system 302. Likewise, during execution, a copy of the monitoring module 324 and the customization module 332 can be stored in the memory 504.

Figure 6:
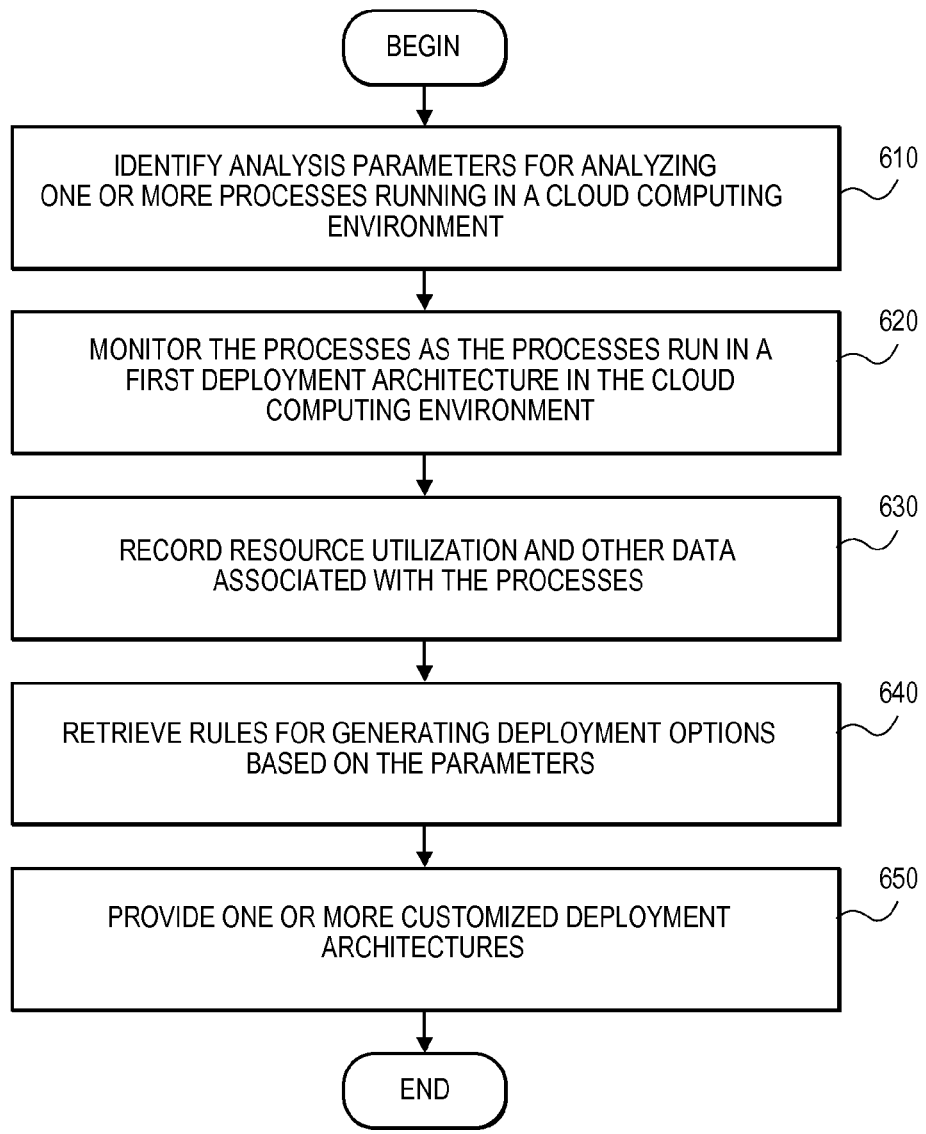
FIG. 6 illustrates a flowchart of an exemplary process for monitoring applications and/or processes running in a cloud computing environment and generating one or more customized deployment architectures that account for the relative importance of cloud resources, according to various embodiments.

FIG. 6 illustrates a flowchart of an exemplary process for monitoring applications and/or processes running in a cloud computing environment and generating one or more customized deployment architectures that account for the relative importance of cloud resources, according to embodiments. In the exemplary process shown, a decision system (e.g., decision system 302 as shown in FIG. 3) can be configured to provide assignments, recommendations, suggestions, alternatives, and options for customized deployment architectures that account for the relative importance of cloud resources to users (e.g., users 310, 312, and/or 314) of a cloud computing environment (e.g., clouds 304 and/or 306). As processing begins, the decision system in 610 can identify one or more parameters or attributes for analyzing applications and/or computing processes (e.g., processes 316 and/or 318) running in the cloud computing environment.

In embodiments, the parameters can be provided by a user associated with the applications. Alternatively or in addition, the decision system can dynamically determine a set of parameters based on a configuration of the computing environment, the applications, the user associated with the applications, etc. The decision system can also retrieve default or predefined set of parameters (e.g., data definition 410 as shown in FIG. 4) from a computer readable storage medium. For example, the decision system can retrieve predefined parameters from a repository (e.g., repository 330) or communicate with cloud management systems (e.g., cloud management systems 320 and/or 322), software vendors (e.g., software vendors 346), or other sources (e.g., the Internet) to retrieve predefined parameters. The parameters can include, for example, a configuration of a current deployment architecture (e.g., a number of machines), a time duration, a number of time intervals, a processor utilization, a network traffic level, a storage utilization, a memory utilization, a software license information, and other parameters indicating usage of software, hardware, and other cloud resources and capacity. One skilled in the art will realize that the other parameters or types of parameters can be used.

In 620, the decision system can monitor the applications and/or computing processes as they run in an existing deployment architecture in the cloud computing environment. The decision system can monitor the applications and/or computing processes for a duration of time or indefinitely until the occurrence of an event. In 630, the decision system can record, in real-time or on a periodic basis, resource usage or utilization data and/or other parameter data associated with the applications and/or computing processes in a computer readable storage medium (e.g., utilization data set 336 in repository 330).

In 640, the decision system can retrieve rules, algorithms, and/or heuristics for generating deployment options based on the parameters. The decision system can retrieve the rules from a computer readable storage medium (e.g., deployment rule set 334 in repository 330).

In 650, the decision system can generate one or more customized deployment architectures by using the deployment rules to evaluate the resource utilization data and/or other parameter data associated with the applications and/or computing processes. For instance, if the processor utilization of the applications and/or computing processes over a specified duration of time is less than ten percent, then the decision system can recommend that the applications and/or computing processes be run on virtual machines instantiated in the cloud computing environment. For another instance, if the applications and/or computing processes have a high network bandwidth utilization, then the decision system can recommend that the applications and/or computing processes be run on a public cloud in the cloud computing environment. For yet another instance, if the applications and/or computing processes average more than 90% utilization of processor capacity, then the decision system can recommend that the applications and/or computing processes be run on an architecture that includes double the processor capacity of the current architecture.

As part of the evaluation of recorded resource usage parameters to generate a customized deployment architecture, the decision system can determine a set of cloud resources that were used to provide the peak resource utilization parameters recorded in 630, and start with this as a baseline. Or a baseline requirement set can be determined in other ways, such as based on the average or mean usage of each cloud resource parameter recorded in 630. From the baseline requirements, the decision system can adjust the rules for generating deployment options using data that reflects the relative importance of one or more of the cloud resources in comparison to other resources. The adjusted rules may then be applied to provide a customized deployment architecture. The process can end after 650, but the process can return to any point and repeat.

Figure 7:
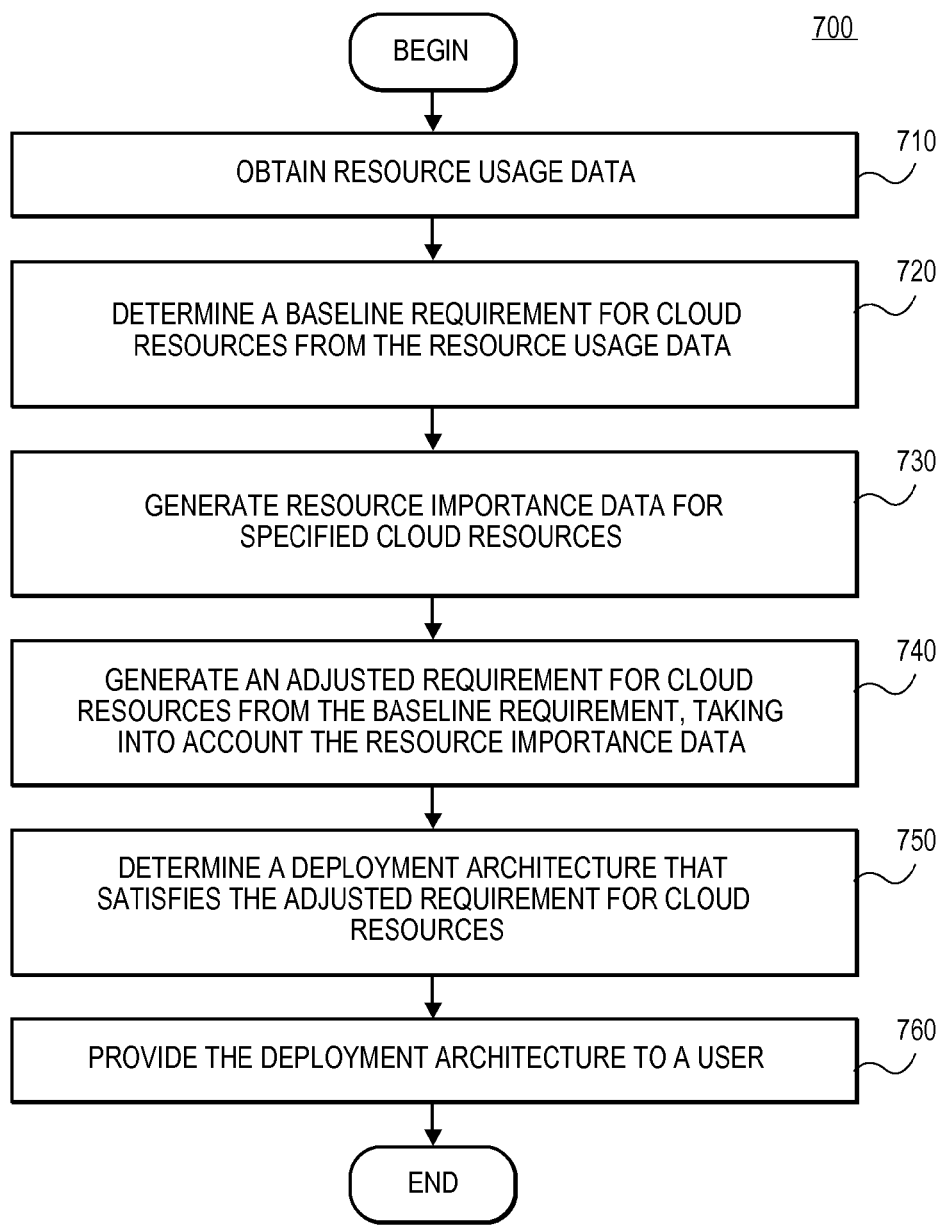
FIG. 7 illustrates a more detailed flowchart of an exemplary process for generating one or more customized deployment architectures that account for the relative importance of cloud resources, according to various embodiments.

FIG. 7 illustrates a flowchart of an exemplary process 700 for generating one or more customized deployment architectures that account for the relative importance of cloud resources. In some embodiments, process 700 may be implemented by decision system 302 using the data in repository 330. In further embodiments, process 700 may be implemented by customization module 332. As shown in FIG. 7, process 700 begins by obtaining resource usage data for an application or computing process, at stage 710. In one embodiment, the resource usage data can be a non-empirical, expected set of resource usage data reflecting a predicted usage of cloud resources by an application(s) or process(es) associated with a user. In another embodiment, the resource usage data can be an empirically measured or recorded usage history for a user and their associated cloud application(s) or process(es). In such an embodiment, the resource usage data can be obtained by monitoring module 324 of decision system 302, for example, as explained with respect to stages 610, 620, and 630 of FIG. 6.

At stage 720, process 700 determines a baseline requirement for cloud resources from the resources usage data. In one embodiment, the baseline requirement can be determined by finding the maximum value for each resource usage parameter in the resource usage data. For a hardware-oriented example, consider a case where the resource usage data shows the use of two processor cores, each having two 64-bit computing units, with the highest level of processor utilization at 9%, the highest level of network traffic at 878 Mbit/s, the highest level of memory usage at 5.0 Gbytes, and the highest level of long-term storage usage at 500 Gbytes. In one embodiment, these max values become the baseline requirements for these resource usage parameters. Similar maximum usage parameters for cloud software applications may also be recorded and used to determine the set of baseline requirements.

In other embodiments, the baseline requirement can be derived from the resource usage parameters in the resource usage data. For example, the baseline requirement for network traffic level capacity may be calculated as the average network traffic level recorded during a monitoring period. In still other embodiments, the baseline requirement can be based on predicted future usage of the cloud resources by the user, for example, in the case of a new user who has no recorded usage history.

At stage 730, process 700 generates resource importance data 335 for a specific cloud resource(s). In certain embodiments, the resource importance data is data that affects the choice of cloud resources that are used to form a deployment architecture for the user. In one embodiment, the resource importance can include data that specifies a minimum amount or level for a parameter representing a cloud resource capacity that must be included in a deployment architecture. For example, the resource importance data can include data specifying a memory size of at least 5.0 Gbytes in a user's deployment architecture. In another embodiment, the resource importance data can include data that specifies different matching weights or decision weights for one or more resource parameters, where the weights represent the relative importance or significance of the cloud resource to the deployment architecture. For example, consider a case where a user is placing a high throughput application in the cloud, such as a database or memory-caching application that uses a large amount of memory. In this case, the resource importance data can include data indicating that large memory capacity is a more important resource than high-speed processing capacity. For another example, consider a case where a user is placing a computation-intensive application, such as 3-D gaming application, in the cloud. In this case, the resource importance data can include data indicating that high-speed processing capacity is a more important resource than memory capacity. The importance of each resource, as represented by the data in the resource importance data 335, often depend on the characteristics of the application(s)/process(es) that a user is placing in the cloud.

In certain embodiments, the resource importance data can be derived from the empirically measured usage history data of a user. For example, patterns of usage may be recognized from past recorded usage histories associated with a user, and those patterns may be used to predict future usage of one or more cloud resources. Predicted high future usage of a cloud resource can be planned for using resource importance data indicating a higher importance of the cloud resource, which can, in turn, cause an adjustment in the deployment architecture to provide additional capacity of the cloud resource.

The relative importance of cloud resources may change over time. For example, the cloud resource usage history of a tax preparation company user may show that in March and April each year, processor usage increases 300%, memory usage increases 250%, and storage usage increases 100%, because of tax season. In one embodiment, the resource importance data may be adjusted to account for historical usage patterns—in this example, adjusted to indicate higher importance for processor resources, memory resources, and storage resources during March and April of each year, which can, in turn, cause an adjustment in the deployment architecture to provide additional processor resources, memory resources, and storage resources during March and April.

In some embodiments, the resource importance data may be adjusted to account for anticipated trends extrapolated from recorded usage history data. For example, consider a case where recorded resource usage data for three consecutive durations or time periods indicates that average processor capacity utilization by a user's applicaton(s) has increased from 7% to 35% to 75%. A projection of this trend into the future indicates that the processor utilization parameter may soon reach 100%. To avoid running out of processor capacity, the resource importance data can be adjusted to indicate the processing capacity has a very high importance, causing, for example, decision system 302 to create a new deployment architecture that includes increased processor capacity to handle the anticipated load.

At stage 740, process 700 generates an adjusted requirement for cloud resources from the baseline requirement, where the adjusted requirement reflects the resource importance data. In embodiments, the adjusted requirement may be determined using the resource importance data. In one exemplary embodiment, the resource importance data can be implemented as a factor indicating an amount of relative increase or decrease in a requirement for a cloud resource. For example, if the baseline requirement for processor capacity indicates that required processor capacity is the equivalent of a single, 2.0 GHz, Intel™ Core 2™ T7200 processor, adjusting the baseline requirement using resource importance data indicating that processor capacity is 200% more important than the baseline requirement, can result in an adjusted requirement indicating that the required processor capacity is the equivalent of three 2.0 GHz, Intel™ Core 2™ T7200 processors.

In another embodiment, the resource importance data can indicate a weighting used for trade-off decisions when not all of the desired web resources are available together. For example, consider a case where a baseline requirement for a user's computation-intensive application(s) is 7.0 Gbytes of memory capacity, processor capacity equivalent to two 2.0 GHz, Intel™ Core 2™ T7200 processors, 700 Gbytes of storage capacity, and 1 Gbit/s of network throughput capacity. Further, the resource importance data for this case indicates high importance for processing capacity resources (e.g., a weighting factor of 9 on a scale of 1-10, ten being the most important), low importance for storage capacity resources (e.g., a weighting factor of 2), and average importance for memory capacity resources and throughput capacity resources (e.g., a weighting factor of 5). In this example, deployment rules 334 can operate to prefer resource configurations (i.e., deployment architectures) that provide sufficient, (or more than sufficient) processor capacity, even at the cost of providing lesser storage capacity, memory capacity, and/or throughput capacity.

At stage 750, process 700 determines a deployment architecture that satisfies the adjusted requirements for cloud resources. In one embodiment, the decision system 302 employs deployment rules 334 to identify a close or best match(es) of available cloud resources that meet the adjusted requirements. Continuing the example from the previous paragraph, consider a case where the two architectures and their sets of resources shown in Table 1 are available for the decision system to choose from:

TABLE 1

| Architecture 1 | Architecture 2 |
| --- | --- |
| 9.0 Gbytes of memory capacity | 5.0 Gbytes of memory capacity |
| One Core 2 ™ T7200 processor capacity | Two Core 2 ™ T7200 processor capacity |
| 800 Gbytes of storage capacity | 600 Gbytes of storage capacity |
| 1 Gbit/s of network throughput capacity | 1 Gbit/s of network throughput capacity |

Without considering the relative importance of each resource, (as indicated by the resource importance data), the best match for the baseline requirements is Architecture 1, which meets or exceeds the baseline requirement for three of the resources (memory capacity, storage capacity, and network throughput capacity) and provides half of the processor capacity requirement. The resource importance data, however, indicates that meeting the processor capacity requirement is the highest priority objective. In an embodiment where decision system 302 takes into account the resource importance data, decision system 302 determines that Architecture 2 is the best match because it provides processor capacity equivalent to two Core 2™ T7200 processors, despite failing to provide all the desired memory capacity and storage capacity specified in the baseline requirement.

At stage 760, process 700 provides the determined deployment architecture to the user. In one embodiment, this stage may include forwarding a report describing the recommended deployment architecture(s) to the user, as described above with respect to FIG. 4C. In another embodiment, this stage may include assigning the determined deployment architecture to the user's application(s)/process(es) such that they run on the determined deployment architecture.

One of ordinary skill will recognize that stages may be modified, added to, or removed from process 700 with departing from the principles of this disclosure. For example, stage 740 can be removed and stage 750 can be modified so that the resource importance data 335 (e.g., weighting data) is applied to affect the functioning of the deployment rules operating on the baseline requirements for cloud resources, without creating intermediary adjusted requirements for cloud resources.

With respect to the foregoing descriptions, certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include non-transitory computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the aspects have been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method, comprising:
    receiving, by a processor, a cloud resource usage data identifying:
        a first cloud resource consumed,
        a first usage level associated with the first cloud resource,
        a second cloud resource consumed, and
        a second usage level associated with the second cloud resource, wherein the first and second cloud resources are in respective first and second clouds;
    assigning, by the processor, a first importance indicator to the first cloud resource;
    assigning, by the processor, a second importance indicator to the second cloud resource;
    analyzing, by the processor, the first and second importance indicators to identify a preference for the first cloud resource over the second cloud resource; and
    causing, by the processor, in view of the analyzing, the first cloud resource to be provisioned at least at the first usage level and the second cloud resource to be provisioned at a reduced usage level below the second usage level.

2. The method of claim 1, further comprising deploying the first cloud resource and the second cloud resource.

3. The method of claim 1, wherein the first cloud and second cloud are independently operated.

4. The method of claim 1, wherein the first and second importance indicators are weighted importance indicators based on analysis of a respective cloud resource in view of at least one factor selected from the set including: memory, processing capability, communication bandwidth, uptime, operating system version, and past resource monitoring data.

5. The method of claim 4, further comprising: receiving the first weighted importance indicators via a user interface.

6. The method of claim 4, further comprising:
    determining a predicted future usage level of the first cloud resource in view of the cloud resource usage data; and
    determining the first weighted importance indicator in view of the predicted future usage level.

7. The method of claim 1, wherein the receiving comprises receiving the cloud usage data over a network from the first cloud resource and the second cloud resource.

8. The method of claim 1, wherein the first importance indicator comprises a utilization metric for the first cloud resource.

9. The method of claim 1, wherein the first cloud resource and the second cloud resource are being used by an application.

10. The method of claim 1, wherein the first cloud resource comprises at least one of: a hardware resource or a software resource.

11. The method of claim 1, wherein causing the first cloud resource and the second cloud resource to be provisioned further comprises:
    identifying a deployment architecture having available capacity of the first cloud resource exceeding the first usage level, the deployment architecture further having available capacity of the second cloud resource below the second usage level.

12. A system, comprising:
    a memory; and
    a processor, operatively coupled to the memory, to:
        receive cloud resource usage data identifying a first usage level associated with a first cloud resource of a first cloud and a second cloud and a second usage level associated with a second cloud resource of a second cloud;
        associate a first importance indicator with the first cloud resource;
        associate a second importance indicator with the second cloud resource; and
        cause, in view of the first and second importance indicators, the second cloud resource to be provisioned at a reduced usage level below the second usage level.

13. The system of claim 12, wherein the first cloud and second cloud are independently operated.

14. The system of claim 12, wherein the first and second importance indicators are weighted importance indicators based on analysis of a respective cloud resource in view of at least one factor selected from the set including: memory, processing capability, communication bandwidth, uptime, operating system version, and past resource monitoring data.

15. The system of claim 12, wherein the first importance indicator comprises a utilization metric for the first cloud resource.

16. The system of claim 12, wherein the first cloud resource comprises at least one of: a hardware resource or a software resource.

17. The system of claim 12, wherein the processor is further to:
    identify a deployment architecture having available capacity of the first cloud resource exceeding the first usage level, the deployment architecture further having available capacity of the second cloud resource below the second usage level.

18. A computer-readable non-transitory storage medium comprising executable instructions that, when executed by a processor, cause the processor to:
    receive, by the processor, a cloud resource usage data identifying a first cloud resource consumed, a first usage level associated with the first cloud resource, a second cloud resource consumed, and a second usage level associated with the second cloud resource, wherein the first and second cloud resources are in respective first and second clouds;

assign a first importance indicator to the first cloud resource;

assign a second importance indicator to the second cloud resource; analyze the first and second importance indicators to identify a preference for the first cloud resource over the second cloud resource; and cause, by the processor, the first cloud resource to be provisioned at least at the first usage level and the second cloud resource to be provisioned at a reduced usage level below the second usage level.

19. The computer-readable non-transitory storage medium of claim 18, wherein the first cloud resource comprises at least one of: a hardware resource or a software resource.

20. The computer-readable non-transitory storage medium of claim 18, further comprising executable instructions causing the processor to:

identify a deployment architecture having available capacity of the first cloud resource exceeding the first usage level, the deployment architecture further having available capacity of the second cloud resource below the second usage level.

\* \* \* \* \*